Sept. 10, 1929.  F. G. BREMER  1,727,365
AUTOMOBILE BUMPER
Filed Nov. 1, 1928  3 Sheets-Sheet 2
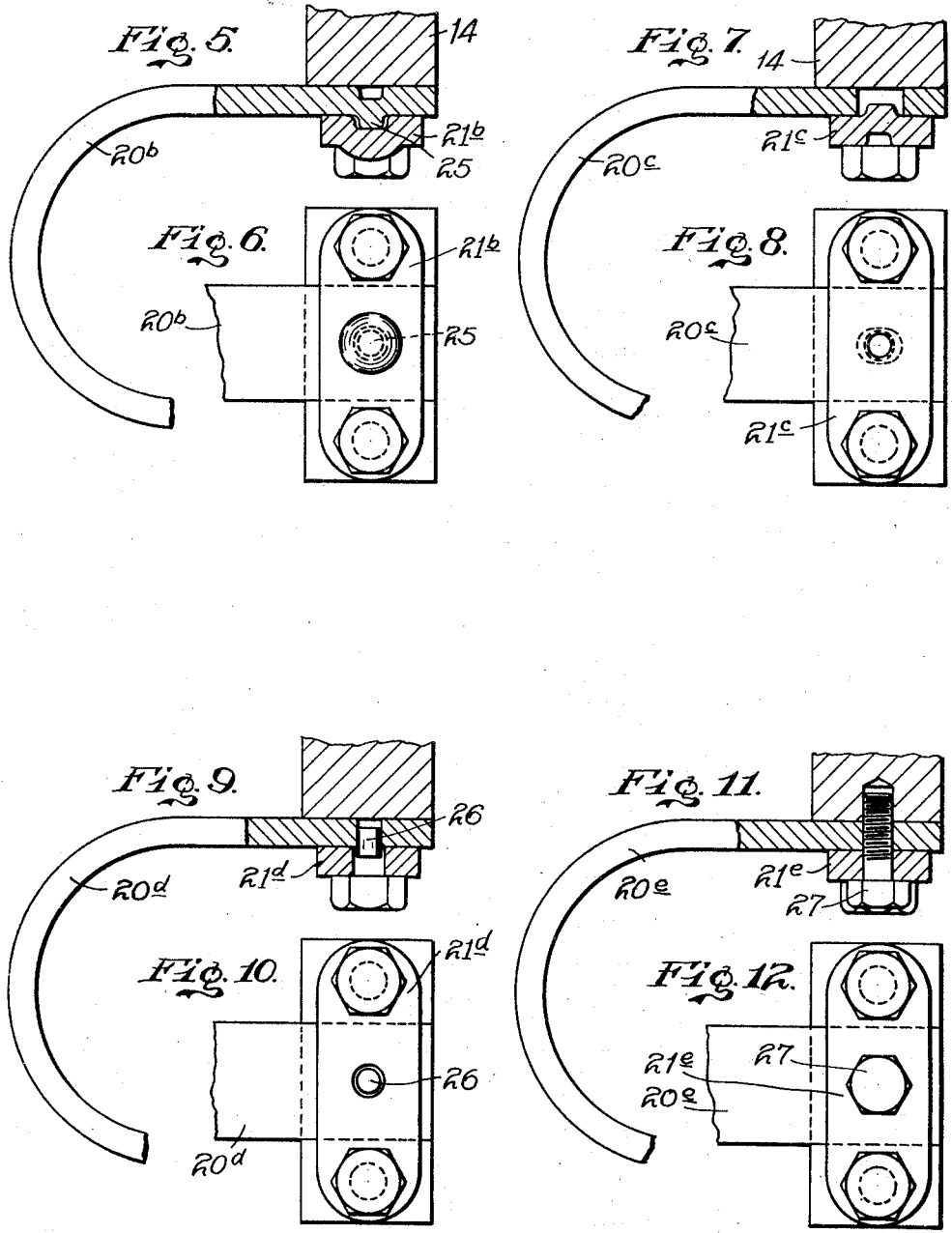
INVENTOR
Frederick G. Bremer,
By Archworth Martin,
Attorney.

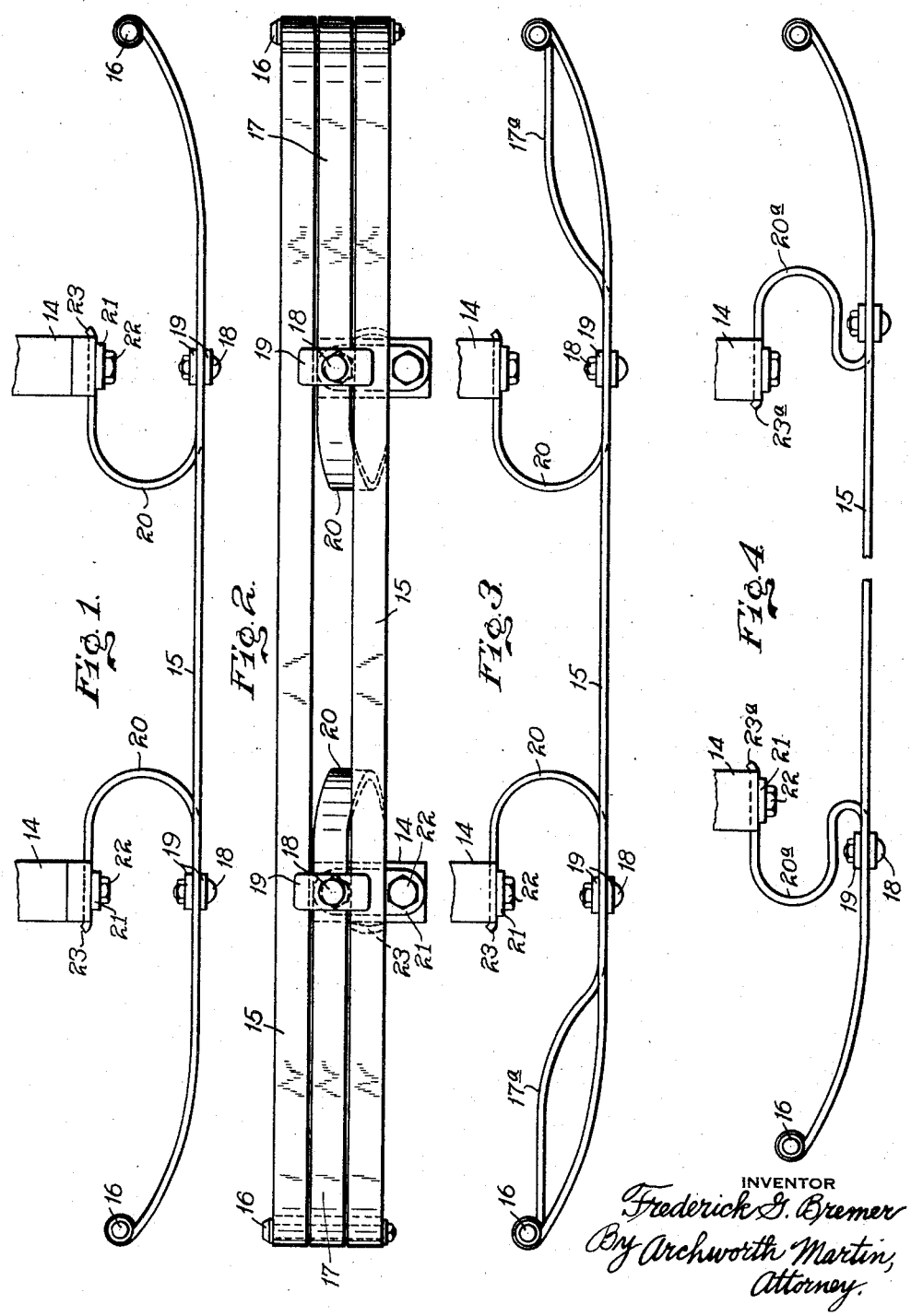

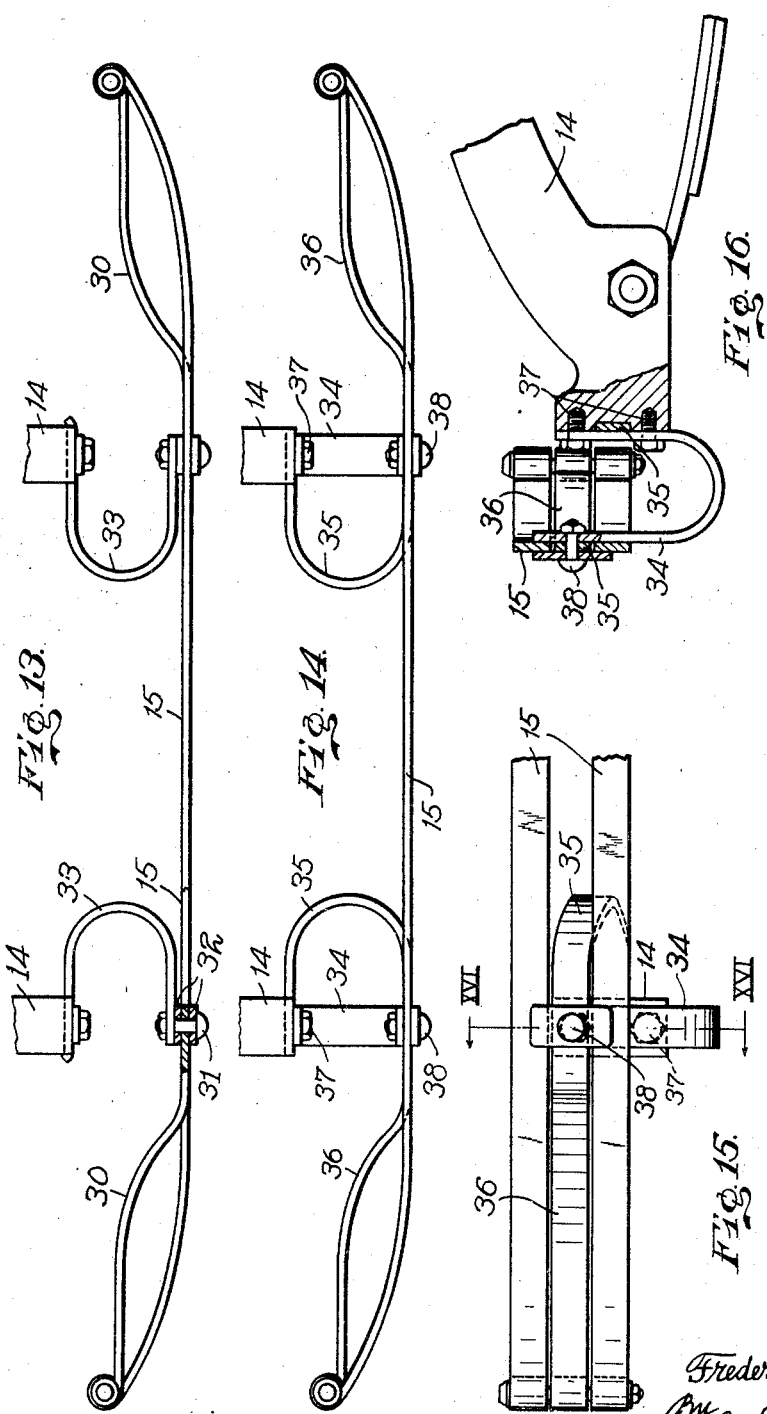

Patented Sept. 10, 1929.

1,727,365

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed November 1, 1928. Serial No. 316,494.

My invention relates to bumper bars for use on motor vehicles, to protect parts of the vehicle from injury and to absorb the shocks of impacts and collisions.

One object of my invention is to provide a bumper structure that is of simple form but is nevertheless effective in service.

Another object of my invention is to provide a bumper structure wherein the attaching members by which the impact-receiving bars are connected to a vehicle frame are rigidly supported against displacement with respect to the frame, and means for preventing displacement of the impact bars relative to the frame and said attaching means, particularly in directions endwise of the bars.

Some of the forms which my invention may take are shown in the accompanying drawing, wherein Figures 1 and 2 are plan and front elevational views, respectively, of one form of device; Fig. 3 is a plan view showing a modified structure; Fig. 4 is a plan view showing still another form of structure; Figs. 5 and 6 are sectional plan and front elevational views, respectively, of another manner in which the bracket arms of Figs. 1 to 4 may be connected to the vehicle frame; Figs. 7 and 8 are sectional plan and front elevational views, respectively, of a modification of the structure of Figs. 5 and 6; Figs. 9 and 10 show another modification of such structure; Figs. 11 and 12 are similar views showing still another modification thereof; Fig. 13 is a plan view, partially in section, of a modification of the tie bar and supporting arm structure of Fig. 3; Fig. 14 shows a plan view of still another modification; Fig. 15 is a fragmentary front elevational view of the structure of Fig. 14, and Fig. 16 is a view taken on the line XVI—XVI of Fig. 15.

In mounting impact bars upon motor vehicles, and particularly impact-receiving structures of the parallel multi-bar type, clamping plates are sometimes employed, with the result that upon thrusts endwise of the impact bars, the bars may be slid slightly in the clamping plates, thus throwing them out of proper alinement with respect to the attaching members and the vehicle. While this difficulty has in some cases been overcome by drilling or notching the impact-receiving bars and passing bolts therethrough, such drilling and notching weakens the bars. Again, the bracket arms, if simply clamped to the ends of the vehicle frames, may be slid slightly in said clamps through the imposition of end thrusts on the bars. The structures hereinafter described overcome the difficulties referred to, in a simple and improved manner.

Referring to Figs. 1 and 2, the side frames of a motor vehicle are indicated by the numerals 14. Impact-receiving bars 15 have eyes formed in their ends through which bolts 16 extend to hold them in assembled relation. Tie bars 17 likewise have eyes formed in their outer ends, through which eyes the bolts 16 extend. The tie bars 17 serve as spacing elements to hold the bars 15 in proper vertically-spaced relation. These tie bars are, for a major portion of their length, disposed in parallelism with, and in the same vertical plane, as the impact bars 15. The tie bars are drilled for the reception of bolts 18 which extend therethrough and which hold clamping plates 19 in snug engagement with the vertical faces of the tie bars and the impact bars. The tie bars 17 are so designated because they prevent displacement of the impact bars with respect to the clamping plates 19 when end thrusts are imposed upon the impact bars.

As shown in the drawing, the tie bars 17 are continued to form bracket arms 20 that are connected to the arms 14. The bracket arms 20 are bent to curved form, so that they will lie flatwise against the ends of the frames 14 and are secured in place against the frames by means of clamping plates 21 and screws or bolts 22. The inner extremities of the arms 20 are bent slightly as indicated at 23 so that they will abut against the side of the frames 14 and thereby form interlocking connection therewith, so that upon imposition of end thrusts on the impact bars 15, the bracket arms will not be displaced with respect to the frames 14 and the clamping plates 21.

In Fig. 3, I have shown a structure similar to that of Figs. 1 and 2, with the exception of the tie bars 17ª whose mid portions are deflected rearwardly to remove them from the plane of the impact bars 15, thus improving the appearance of the structure, rendering it less massive in appearance, and nevertheless not detracting from the strength thereof.

Fig. 4 shows a structure similar in all respects to the arrangement shown in Figs. 1 and 2, except for the bracket arms 20ª which have reverse bends so that their inner extremities 23ª will abut against the inner sides of the frames 14 and so that the deeper bends of the arms will extend toward the ends of the impact bars 15 instead of extending toward the center line of the vehicle. It will be understood that the tie bars of this structure could be deflected rearwardly as at 17ª in Fig. 3.

Figs. 5 and 6 show another manner in which bracket arms 20ᵇ may be held against displacement in their clamping devices with respect to the side frames 14. In this arrangement, the clamping plate 21ᵇ has a recess for the reception of a lug 25 that is stamped from the inner end portion of the bracket arm. Since the plate 21ᵇ is bolted to the frame 14, the bracket arm is securely held against displacement with respect to the frame.

In Figs. 7 and 8, the bracket arm 20ᶜ has a hole near its inner end for the reception of a lug projecting inwardly from the clamping plate 21ᶜ, for the purpose of preventing shifting of the bracket arm with respect to the vehicle frame.

Figs. 9 and 10 show both the bracket arm 20ᵈ and the clamping plate 21ᵈ drilled to permit insertion of a wedge or locking pin 26 which is driven into the hole in the bracket arm and projects outwardly a sufficient distance to engage the wall of the hole in the clamping plate 21ᵇ, the member 26 serving as a key to prevent shifting of the parts as above-explained.

In Figs. 11 and 12, the bracket arm 20ᵉ is held against shifting by means of a screw 27 which extends through the clamping plate 21ᵉ and the bracket arm and has threaded engagement with the end of the vehicle frame.

In Fig. 13, the tie bars 30 are of substantially the same form as tie bars 17ª, except that they terminate at the clamping bolts 31 instead of being continued rearwardly to the car frames 14. The bolt 31 and clamping plates 32 serve to connect the inner ends of the tie bars 30 and the impact-receiving bars 15 together. The bolts 31 serve also to connect the impact-receiving structure to bracket arms 33 which arms correspond to the extensions 20 of Fig. 1, and these arms are in turn connected to the frame members 14, as in Figs. 1 and 3.

Figs. 14 to 16 show a structure also similar to that of Fig. 3, but wherein yoke-like members 34 serve to supplement the bracket arms 35 which are shown as continuations of tie bars 36 and also serve as a means for clamping the rear ends of the bracket arms 35 to the vehicle frames 14, and the forward portions of said bracket arms and the inner ends of the tie bars 36 to the impact bars. Screws 37 secure the inner ends of these members 34 to the vehicle frame and bolts 38 serve to connect the tie bar and the impact bars to the outer end thereof, as shown more clearly in Fig. 16.

I claim as my invention:—

1. Bumper structure comprising an impact-receiving bar, an attaching plate between the mid portion and each end thereof, tie bars connected at their outer ends to said bar, means for connecting each of the tie bars to one of said plates, and a bracket arm portion connected to each of said plates by the said means, and extending rearwardly, the rear ends of the arms being adapted for connection to a vehicle frame.

2. Bumper structure comprising an impact-receiving bar, an attaching plate between the mid portion and each end thereof, tie bars connected at their outer ends to said bar, means for connecting each of the tie bars to one of said plates, and a bracket arm portion connected to each of said plates and extending rearwardly, the rear ends of the arms being adapted for connection to a vehicle frame, and each of the said tie bars and its associated bracket arm being rigidly connected.

3. Bumper structure comprising an impact-receiving bar, an attaching plate between the mid portion and each end thereof, tie bars connected at their outer ends to said bar, means for connecting each of the tie bars to one of said plates, a bracket arm portion connected to each of said plates and extending rearwardly, the rear ends of the arms being adapted for connection to a vehicle frame, each of the said tie bars and the bracket arms being rigidly connected to one of said plates, and means for effecting an interlocking connection between the rear end of one of said bracket arms and a vehicle frame.

4. Bumper structure comprising an impact-receiving bar, an attaching plate between the mid portion and each end thereof, tie bars connected at their outer ends to said bar, means for connecting each of the tie bars to one of said plates, and a bracket arm portion connected to each of said plates and extending rearwardly, their rear ends being adapted for connection to a vehicle frame, the said tie bar and bracket arm being integrally formed.

5. Bumper structure comprising a pair of vertically-spaced parallel bars, a pair of tie bars each having its outer end disposed between adjacent ends of parallel bars and connected thereto, means for connecting each of the tie bars to the bumper bars at a point intermediate the ends and the mid portion of the parallel bars, and a bracket arm rigidly connected to each of said tie bars and extending rearwardly for attachment to a vehicle frame.

6. Bumper structure comprising a pair of vertically-spaced parallel bars, a pair of tie bars each having its outer end disposed between adjacent ends of parallel bars and connected thereto, means for connecting each of the tie bars to the bumper bars at a point intermediate the ends and the mid portion of the parallel bars, and a bracket arm integrally formed with each of said tie bars and extending rearwardly for attachment to a vehicle frame.

7. Bumper structure comprising an impact-receiving bar, a pair of tie bars each having its outer end connected to an end of the impact bar, means for connecting the inner end of each tie bar to the impact bar at a point intermediate the mid portion and one end of the impact bar, a pair of bracket arms, and means for connecting each of said bracket arms to the inner end of one tie bar at the first-named point of connection.

8. Bumper structure comprising an impact-receiving bar, a pair of tie bars each having its outer end connected to an end of the impact bar, means for connecting the inner end of each tie bar to the impact bar at a point intermediate the mid portion and one end of the impact bar, a pair of bracket arms, means for connecting each of said bracket arms to the impact bar at the first-named point of connection, and a pair of bracket members each of curved form and having its ends held in assembled relation with respect to the forward and rear ends of one of the bracket arms.

9. Bumper structure comprising an impact-receiving bar, a pair of tie bars each having its outer end connected to an end of the impact bar, means for connecting the inner end of each tie bar to the impact bar at a point intermediate the mid portion and one end of the impact bar, a pair of bracket arms, means for connecting each of said bracket arms to the impact bar at the first-named point of connection, and a pair of bracket members each of curved form and having its ends held in assembled relation with respect to the forward and rear ends of one of the bracket arms, the said bracket member being curved in a plane transverse to the plane of its associated bracket arm.

10. The combination with bumper supporting surfaces of a vehicle frame, of an impact-receiving bar, a bracket arm having one end connected to said bar and the other end abutting one of the said surfaces, and a bracket member having its forward end connected to the bumper bar and its rear end connected to one of the said surfaces, in overlapping relation to the forward and rear ends of the said bracket arm.

11. The combination with bumper supporting surfaces of a vehicle frame, of an impact-receiving bar, a bracket arm having one end connected to said bar and the other end abutting one of the said surfaces, and a bracket member having its forward end connected to the bumper bar and its rear end connected to one of the said surfaces and disposed in a plane transverse to the plane of the said bracket arm.

12. The combination with a bumper supporting surface of a vehicle frame, of a pair of impact-receiving bars, a clamping plate disposed across one face of said bars, a bracket arm extending from said plate rearwardly and having its rear end abutting against said surface, a bracket member having its ends disposed in overlapping relation to the forward and rear ends of the bracket arm, and means for connecting the forward and rear ends of said member to the said surface and the said clamping plate respectively in overlapping relation to the ends of the bracket arm, to serve as clamping plates for such ends.

In testimony whereof I, the said FREDERICK G. BREMER have hereunto set my hand.

FREDERICK G. BREMER.